(12) United States Patent
Lee et al.

(10) Patent No.: US 11,210,493 B2
(45) Date of Patent: Dec. 28, 2021

(54) FINGERPRINT RECOGNITION CARD

(71) Applicant: SISOUL CO., LTD, Seongnam-si (KR)

(72) Inventors: Wookyu Lee, Incheon (KR); Wangee Cho, Yongin-si (KR)

(73) Assignee: SISOUL CO., LTD., Seongnam-si (KR)

( * ) Notice: Subject to any disclaimer, the term of this patent is extended or adjusted under 35 U.S.C. 154(b) by 0 days.

(21) Appl. No.: 16/897,291

(22) Filed: Jun. 10, 2020

(65) Prior Publication Data

US 2021/0056285 A1 Feb. 25, 2021

(30) Foreign Application Priority Data

Aug. 23, 2019 (KR) .................. 10-2019-0103393

(51) Int. Cl.
*G06K 9/20* (2006.01)
*G06K 9/00* (2006.01)
(Continued)

(52) U.S. Cl.
CPC ......... *G06K 9/00087* (2013.01); *G06F 21/32* (2013.01); *G06K 9/00926* (2013.01);
(Continued)

(58) Field of Classification Search
CPC .................. G06K 9/00006–9/0012; G06K 19/07773–19/07794; G06K 19/07783;
(Continued)

(56) References Cited

U.S. PATENT DOCUMENTS 6,848,617 B1 2/2005 Fries et al.
6,856,291 B2 2/2005 Mickle et al.
(Continued)

FOREIGN PATENT DOCUMENTS

EP 2939309 11/2015
EP 3107147 A1 12/2016
(Continued)

OTHER PUBLICATIONS

Texas Instruments, "LM2575 1-A Simple Step-Down Switching Voltage Regulator", SLVS569F—Jan. 2005—Revised Aug. 2015, pp. 1-16, addendum pp. 1-3. (Year: 2015).*
(Continued)

*Primary Examiner* — Brian Werner
(74) *Attorney, Agent, or Firm* — Park, Kim & Suh, LLC

(57) ABSTRACT

A fingerprint recognition card is provided to perform authentication and security functions by recognizing a fingerprint of a user and includes a fingerprint recognition unit configured to detect a fingerprint of a user, a control unit configured to perform registration authentication for the detected fingerprint of the user, a communication unit configured to perform tagging to an external reader depending on the registration authentication of the control unit, and an inductive current generator configured to generate an inductive current in response to approaching the external reader. The inductive current generator generates the inductive current when a distance to the external reader is within a predetermined distance, converts the generated inductive current to a direct current (DC), and supplies the output voltage, which is generated by reducing the input voltage of the converted DC, to the fingerprint recognition unit, the control unit, and the communication unit.

9 Claims, 2 Drawing Sheets

(51) Int. Cl.
  *H01L 29/866* (2006.01)
  *G06Q 20/34* (2012.01)
  *G06K 19/077* (2006.01)
  *G06F 21/32* (2013.01)
(52) U.S. Cl.
  CPC ..... *G06K 19/07779* (2013.01); *G06Q 20/341* (2013.01); *H01L 29/866* (2013.01)
(58) Field of Classification Search
  CPC . G06Q 20/341; G06Q 20/352; G06Q 20/3674
  See application file for complete search history.

(56) References Cited

U.S. PATENT DOCUMENTS

| | | | |
|---|---|---|---|
| 7,044,392 | B2 | 5/2006 | Tsou et al. |
| 8,222,881 | B2 | 7/2012 | Ivanov et al. |
| 8,284,581 | B2 | 10/2012 | Ivanov |
| 8,362,745 | B2 | 1/2013 | Tinaphong |
| 8,756,680 | B2 | 6/2014 | Shashidhar |
| 8,816,633 | B1 | 8/2014 | Neal et al. |
| 8,820,647 | B2 | 9/2014 | Kim |
| 8,875,996 | B2 | 11/2014 | Mestres et al. |
| 8,933,781 | B2 | 1/2015 | Desnoyers |
| 9,020,456 | B2 | 4/2015 | Wentzloff et al. |
| 9,063,559 | B2 | 6/2015 | Ivanov et al. |
| 9,342,774 | B1 | 5/2016 | Lin |
| 9,385,625 | B1 | 7/2016 | Kwong et al. |
| 9,471,825 | B2 | 10/2016 | Lowe |
| 9,483,679 | B2 | 11/2016 | Neskovic et al. |
| 9,577,529 | B2 | 2/2017 | Stanzione |
| 9,613,251 | B2 | 4/2017 | Neskovic et al. |
| 9,768,646 | B2 | 9/2017 | Younis et al. |
| 9,768,707 | B2 | 9/2017 | Young et al. |
| 9,768,708 | B2 | 9/2017 | Mortazawi et al. |
| 9,792,516 | B2 | 10/2017 | Vogel et al. |
| 9,812,948 | B2 | 11/2017 | Roine et al. |
| 9,911,075 | B1 | 3/2018 | Thueringer et al. |
| 10,014,730 | B2 | 7/2018 | Nayak |
| 10,044,259 | B2 | 8/2018 | D'Amico et al. |
| 10,044,290 | B2 | 8/2018 | Finocchiaro et al. |
| 10,063,063 | B2 | 8/2018 | Chen |
| 10,079,438 | B2 | 9/2018 | Tanabe et al. |
| 10,083,392 | B2 | 9/2018 | Lowe |
| 10,141,792 | B2 | 11/2018 | Linnartz |
| 10,176,415 | B2 | 1/2019 | Wendling |
| 10,176,416 | B1 | 1/2019 | Lektomiller |
| 10,199,869 | B2 | 2/2019 | Mortazawi et al. |
| 10,243,479 | B2 | 3/2019 | Young et al. |
| 10,291,077 | B2 | 5/2019 | Younis et al. |
| 10,298,071 | B2 | 5/2019 | Gudan et al. |
| 10,312,743 | B2 | 6/2019 | Ouda et al. |
| 10,348,130 | B2 | 7/2019 | Robert |
| 10,348,136 | B2 | 7/2019 | John |
| 2013/0207786 | A1* | 8/2013 | Hutzler .............. G06K 19/0718 340/10.51 |
| 2017/0228631 | A1 | 8/2017 | Larsen et al. |
| 2017/0242054 | A1 | 8/2017 | Montiel |
| 2017/0286789 | A1 | 10/2017 | Wintergerst Lavin et al. |
| 2017/0293342 | A1 | 10/2017 | Field |
| 2017/0293792 | A1 | 10/2017 | Lavin |
| 2017/0293793 | A1 | 10/2017 | Lavin |
| 2017/0300680 | A1 | 10/2017 | Wendling |
| 2017/0323166 | A1 | 11/2017 | Colussi et al. |
| 2017/0337417 | A1 | 11/2017 | Lowe et al. |
| 2018/0004927 | A1 | 1/2018 | Lowe |
| 2018/0089548 | A1 | 3/2018 | Sims et al. |
| 2018/0101718 | A1 | 4/2018 | Lowe et al. |
| 2018/0253587 | A1 | 9/2018 | Lowe |
| 2018/0253634 | A1 | 9/2018 | Fortassin et al. |
| 2018/0268274 | A1 | 9/2018 | Lowe |
| 2018/0373857 | A1 | 12/2018 | Larsen |
| 2018/0375661 | A1 | 12/2018 | Lavin et al. |
| 2019/0019005 | A1 | 1/2019 | Pompeani et al. |
| 2019/0050623 | A1 | 2/2019 | Lavin et al. |
| 2019/0065716 | A1 | 2/2019 | Lavin |
| 2019/0065918 | A1 | 2/2019 | Humborstad |
| 2019/0102662 | A1 | 4/2019 | Snell et al. |
| 2019/0102665 | A1 | 4/2019 | Snell et al. |
| 2019/0156098 | A1 | 5/2019 | Demetriou |
| 2019/0236321 | A1 | 8/2019 | Poon et al. |

FOREIGN PATENT DOCUMENTS

| | | |
|---|---|---|
| EP | 3479278 | 5/2019 |
| EP | 3479289 | 5/2019 |
| EP | 3583543 A1 | 12/2019 |
| JP | 6019529 B2 | 11/2016 |
| JP | 6076057 B2 | 2/2017 |
| JP | 6119502 B2 | 4/2017 |
| JP | 6152919 B1 | 6/2017 |
| JP | 2018-130794 A | 8/2018 |
| JP | 6403036 B1 | 10/2018 |
| KR | 10-1183525 B1 | 9/2012 |
| KR | 10-1238686 B1 | 3/2013 |
| KR | 10-1289958 B1 | 7/2013 |
| KR | 10-1439039 B1 | 9/2014 |
| KR | 10-1491929 B1 | 2/2015 |
| KR | 10-2017-0025199 A | 3/2017 |
| KR | 10-1721897 B1 | 4/2017 |
| KR | 10-1725476 B1 | 4/2017 |
| KR | 10-1791512 B1 | 10/2017 |
| KR | 10-1792002 B1 | 11/2017 |
| KR | 10-1842861 B1 | 3/2018 |
| KR | 10-2018-0038351 A | 4/2018 |
| KR | 10-2018-0041014 A | 4/2018 |
| KR | 10-2018-0070841 A | 6/2018 |
| KR | 10-2018-0103805 A | 9/2018 |
| KR | 10-2018-0118583 A | 10/2018 |
| KR | 10-1894086 B1 | 10/2018 |
| KR | 10-2020-0019873 A | 2/2020 |
| WO | 2007/022423 A2 | 2/2007 |
| WO | 2015/019106 A2 | 2/2015 |
| WO | 2018/001831 A1 | 1/2018 |
| WO | 2018/002367 A1 | 1/2018 |
| WO | 2018/151647 A1 | 8/2018 |
| WO | 2020/013931 A1 | 1/2020 |

OTHER PUBLICATIONS

Texas Instruments, "Reducing Output Ripple and Noise with the TPS84259", Nov. 2012, pp. 1-7. (Year: 2012).*

* cited by examiner

FINGERPRINT RECOGNITION CARD

CROSS-REFERENCE TO RELATED APPLICATIONS

A claim for priority under 35 U.S.C. § 119 is made to Korean Patent Application No. 10-2019-0103393 filed on Aug. 23, 2019, in the Korean Intellectual Property Office, the entire contents of which are hereby incorporated by reference.

BACKGROUND

Embodiment of the inventive concept described herein relate to a fingerprint recognition card, and more particularly, relate to a fingerprint recognition card capable of performing authentication and security functions by recognizing a fingerprint of a user.

In general, a smart card may be mainly classified into a contact smart card and a contactless smart card.

The contact card, which receives power and a signal from a terminal through a physical contact, may be used for banking business and a credit card.

In addition, the contactless smart card, which is a card to transmit or receive data through a radio frequency (RF) scheme, may be used as a transportation card, for example, in a bus or a subway.

Such a smart card is applied to an identification system, and a card reader is mainly installed at entrances of a research center or other places requiring confidentiality, thereby allowing only a person having a regulated smart card to enter.

However, the identification system using such a smart card has a problem that, when the smart card is lost, a person having the lost smart card enters using without permission by using the lost smart card.

Accordingly, a fingerprint recognition card has been developed to perform biometrics authentication, such as fingerprint recognition, such that security authentication is enhanced.

In other words, an authentication processing algorithm of a convergence card, which is an existing fingerprint recognition card to make NFC module short range wireless communication together with fingerprint recognition, has been registered in Korean Patent Registration No. 10-1792002 (issued on Oct. 25, 2017).

However, since the existing fingerprint recognition card additionally requires power or charging of power, the weight and the size of the fingerprint recognition card are increased to increase manufacturing cost. Accordingly, since the NFC reader has a shorter operating distance, when the distance to the NFC reader is long, an operation of authenticating a fingerprint may not be smoothly performed.

Accordingly, there has been required the development of a fingerprint recognition card capable of being manufactured with a light weight in a smaller size at lower cost such that the fingerprint recognition card is operated without additional power, and of increasing the operating distance thereof by optimizing power consumption efficiency, thereby enhancing a fingerprint authentication function.

SUMMARY

Embodiments of the inventive concept provide a fingerprint recognition card capable of outputting power by generating an inductive current and reducing an input voltage to allow an operation without additional power, and of increasing an operating distance by optimizing power consumption efficiency to improve a fingerprint authentication function.

The technical problems to be solved by the inventive concept are not limited to the aforementioned problems, and any other technical problems not mentioned herein will be clearly understood from the following description by those skilled in the art to which the inventive concept pertains.

According to an exemplary embodiment, a fingerprint recognition card may include a fingerprint recognition unit configured to detect a fingerprint of a user, a control unit configured to perform registration authentication for the detected fingerprint of the user, a communication unit configured to perform tagging to an external reader depending on the registration authentication of the control unit, and an inductive current generator configured to generate an inductive current in response to approaching the external reader.

The inductive current generator may generate the inductive current when a distance to the external reader is within a specific distance, convert the generated inductive current to a direct current (DC), and supply the output voltage, which is generated by reducing the input voltage of the converted DC, to the fingerprint recognition unit, the control unit, and the communication unit. In this case, the inductive current generator may include a coil antenna unit to generate the inductive current, a rectifying unit configured to convert the generated inductive current from an alternating current (AC) to the DC, and a voltage reducing circuit unit configured to output the output voltage generated by reducing the input voltage of the converted DC.

The coil antenna unit may include a coil wound around an outermost edge of a card surface along the outermost edge.

The voltage reducing circuit unit may be configured to output the voltage generated by reducing the input voltage based on the maximum current consumption of the fingerprint recognition unit and the control unit.

The voltage reducing circuit unit may include a first signal converting unit configured to convert an input signal, which is input into a first input stage, to a pulse signal to be output and maintain an amplitude of the output signal, based on a feedback signal input into a second input stage, and a second signal converting unit configured to receive the converted pulse signal from the first signal converting unit to convert the converted pulse signal to a smoothing signal to be output and to feed back the output signal to the first signal converting unit.

The voltage reducing circuit unit may further include a constant voltage unit configured to maintain the input signal, which is input into the first input stage of the first signal converting unit, to have a constant voltage.

The voltage reducing circuit unit may further include a ripple removing unit connected to an output stage of the second signal converting unit to remove a ripple of the second output signal which is output from the second signal converting unit.

The communication unit may include a short-range wireless communication module.

The control unit may be configured to determine whether the detected fingerprint is a registered fingerprint when the fingerprint is detected from the fingerprint recognition unit, and control the communication unit to perform tagging to the external reader, when the detected fingerprint is the registered fingerprint.

The control unit may be configured to control the communication unit not to perform the tagging to the external reader, when the detected fingerprint is not the registered fingerprint.

The control unit may process any one of registration, matching, and deletion with respect to a fingerprint detected from the fingerprint recognition unit, when the fingerprint is detected from the fingerprint recognition unit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, the detailed embodiment of the inventive concept will be described with reference to accompanying drawings.

Suffixes of components, such as "module" and "unit", which are employed in the following description, are merely intended to facilitate description of the specification, and the term "module" and the term "unit" may be interchangeably used. For example, the term "module", and "unit" may be configured such that the functions thereof are implemented by at least one processor.

Further, although the embodiments of the inventive concept will be described in detail with reference to accompanying drawings and content described with reference to drawings, the inventive concept is not limited by the embodiments.

The terminology used in the present specification is a general terminology that is currently widely used while considering functions in the inventive concept, but this may vary according to the intention or custom of those skilled in the art or the appearance of a new technology. In addition, in specific cases, some terms are arbitrarily selected by applicant. In this case, their meaning will be described in the description of the relevant invention. Therefore, the terms used in the present specification should be interpreted based on the actual meaning of the terms and the contents throughout the whole specification, and not interpreted merely using names of the terms.

Figure 1:
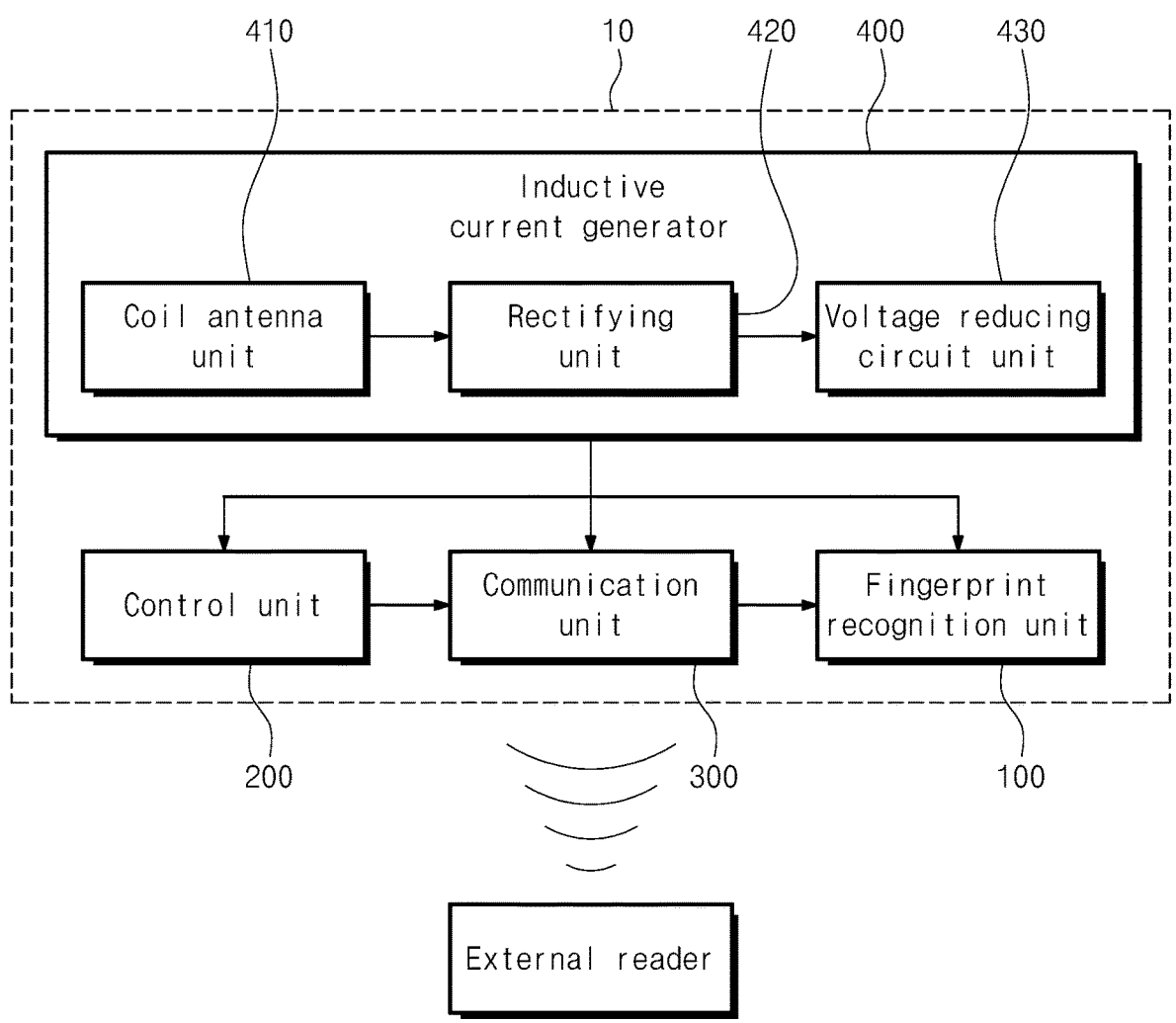
FIG. 1 is a block diagram illustrating a fingerprint recognition card, according to the inventive concept.

FIG. 1 is a block diagram illustrating a fingerprint recognition card, according to the inventive concept.

As illustrated in FIG. 1, according to the inventive concept, a fingerprint recognition card 10 may include a fingerprint recognition unit 100 to detect the fingerprint of a user, a control unit 200 to authenticate the registration of the detected fingerprint of the user, a communication unit 300 to perform tagging to an external reader depending on registration authentication of the control unit 200, and an inductive current generator 400 to generate an inductive current in response to approaching the external reader.

In this case, the inductive current generator 400 may generate the inductive current when a distance to the external reader is within a specific distance, may convert the generated inductive current to a direct current (DC), may reduce an input voltage of the converted DC, and may apply an output voltage generated by reducing the input voltage to the fingerprint recognition unit 100, the control unit 200, and the communication unit 300.

For example, the inductive current generator 400 may include a coil antenna unit 410 to generate the inductive current in response to approaching the external reader, a rectifying unit 420 to convert the generated inductive current from an alternating current (AC) to a direct current, and a voltage reducing circuit unit 430 to reduce the input voltage generated from the converted DC and output the reduced voltage.

In this case, the coil antenna unit 410 may be disposed such that a coil is wound around the outermost edge of a card surface. This is because the greater size of the coil antenna unit 410 is advantageous when harvesting energy. Accordingly, it is advantageous that the coil is wound around the outermost edge of the card surface along the outermost edge.

The coil antenna unit 410 may have one coil turn to about five coil turns, but the inventive concept is not limited thereto. This is because that the smaller number of coil turns of the coil antenna unit 410 is advantageous when harvesting energy. Accordingly, it is advantageous that one coil turn to about five coil turns.

The voltage reducing circuit unit 430 may reduce the input voltage based on the maximum current consumption of the fingerprint recognition unit 100 and the control unit 200, and may output the reduced voltage.

For example, the voltage reducing circuit unit 430 may be reduce the input voltage such that a current value, which is equal to or greater than the maximum current consumption of the fingerprint recognition unit 100 and the control unit 200, is applied to the fingerprint recognition unit 100 and the control unit 200.

This is because when the voltage reduced through the voltage reducing circuit unit 430 is applied to the fingerprint recognition unit 100 and the control unit 200, and when a current is supplied to satisfy the maximum current consumption of the fingerprint recognition unit 100 and the control unit 200, an operating distance is increased to improve the fingerprint recognition function.

Therefore, according to the inventive concept, since the inductive current generator 400 generates an inductive current even when the distance to the external reader is in the range of about 40 mm to about 60 mm to sufficiently supply power through energy harvesting, the operating distance is increased to improve the fingerprint recognition function.

For example, the inductive current generator 400 may generate the inductive current when the distance to the external reader is within about 60 mm.

The voltage reducing circuit unit 430 may be designed in various circuit forms to enhance the maximum power consumption efficiency of the fingerprint recognition unit 100 and the control unit 200.

For example, the voltage reducing circuit unit 430 may include a first signal converting unit (reference numeral 4320 of FIG. 2) to convert an input signal, which is input into a first input stage, to a pulse signal to be output and to maintain the amplitude of an output signal, which is output through conversion to the pulse signal, based on a feedback signal input into a second input stage, and a second signal converting unit (reference numeral 4330 of FIG. 2) to receive the pulse signal from the first signal converting unit, to convert the pulse signal to a smoothing signal to be output, and to feed back an output signal, which is output through conversion to the smoothing signal, to the second input stage of the first signal converting unit.

In this case, the first signal converting unit (reference numeral 4320 of FIG. 2) may include a pulse signal converter to convert the input signal to the pulse signal when the input signal is input into the first input stage, and to output the converted pulse signal to an output stage, and a comparator to compare the feedback signal with the input signal when the feedback signal is input into the second input stage and to maintain the amplitude of the output signal which is output to the output stage.

In addition, the second signal converting unit (reference numeral 4330 of FIG. 2) may include an inductor having one side connected to the output stage of the first signal converting unit (reference numeral 4320 of FIG. 2) and an opposite side connected to the second input stage of the first signal converting unit, and a capacitor having one side connected to the opposite side of the inductor and an opposite side which is grounded.

In addition, the voltage reducing circuit unit 430 may further include a constant voltage unit (reference numeral 4310 of FIG. 2) to maintain the input signal, which is input into the first input stage of the first signal converting unit (reference numeral 4320 of FIG. 2), to have a constant voltage.

In this case, the constant voltage unit may include a zener diode having one side connected to the first input stage of the first signal converting unit and an opposite side which is grounded, and an input capacitor having one side, which is connected to a node, which is interposed between the first input stage of the first signal converting unit and the one side of the zener diode, and an opposite side which is grounded.

In this case, in the constant voltage unit, the zener diode and the input capacitor may be parallel-connected to each other.

In addition, the voltage reducing circuit unit 430 may further include a ripple removing unit (reference numeral 4340 of FIG. 2) connected to the output stage of the second signal converting unit to remove a ripple of the output signal from the second signal converting unit.

For example, the ripple removing unit may include a ferrite bead, but the inventive concept is not limited thereto.

The communication unit 300 may include a short-range wireless communication module. For example, the short-range wireless communication module may include an NFC chip, but the inventive concept is not limited thereto.

The control unit 200 may determine whether the detected fingerprint is a registered fingerprint when the fingerprint is detected from the fingerprint recognition unit 100, and may control the communication unit 300 to perform tagging to the external reader, when the detected fingerprint is the registered fingerprint.

If necessary, the control unit 200 may control the communication unit 300 not to perform tagging to the external reader, when the detected fingerprint is not the registered fingerprint.

In addition, the control unit 200 may process any one of registration, matching, and deletion with respect to a fingerprint detected from the fingerprint recognition unit 100, when the fingerprint is detected from the fingerprint recognition unit 100.

Meanwhile, the external reader (reader) may be an NFC reader to generate an electromagnetic field, but the inventive concept is not limited thereto.

According to the fingerprint recognition card 10 having the configuration of the inventive concept, when the fingerprint recognition card 10 is close to the external reader, the inductive current generator 400 may generate the inductive current, may convert the generated inductive current to a DC current, may reduce an input voltage of the converted DC current, and may apply the reduced voltage (an output voltage) to the fingerprint recognition unit 100, the control unit 200, and the communication unit 300.

According to the inventive concept, the fingerprint recognition card 10 may operate the fingerprint recognition unit 100 and the control unit 200 by optimizing the power consumption efficiency of the fingerprint recognition unit 100 and the control unit 200.

In this case, the control unit 200 of the fingerprint recognition card 10 may determine whether the detected fingerprint is a registered fingerprint when the fingerprint is detected from the fingerprint recognition unit 100, and may control the communication unit 300 to perform tagging to the external reader, when the detected fingerprint is the registered fingerprint.

The external reader may perform a corresponding function depending on user authentication, when is tagged with the communication unit 300 of the fingerprint recognition card 10.

For example, when the inventive concept is applied to a device to authenticate door security, a door may be open or closed depending on door authentication.

As described above, the inventive concept may provide an effect in which power may be output by generating the inductive current and reducing the input voltage to allow an operation without additional power, so the fingerprint recognition card may be manufactured at the lower cost, with light weight, in a smaller size, and the power consumption efficiency may be optimized to increase the operating distance, thereby improving the fingerprint authentication function.

Figure 2:
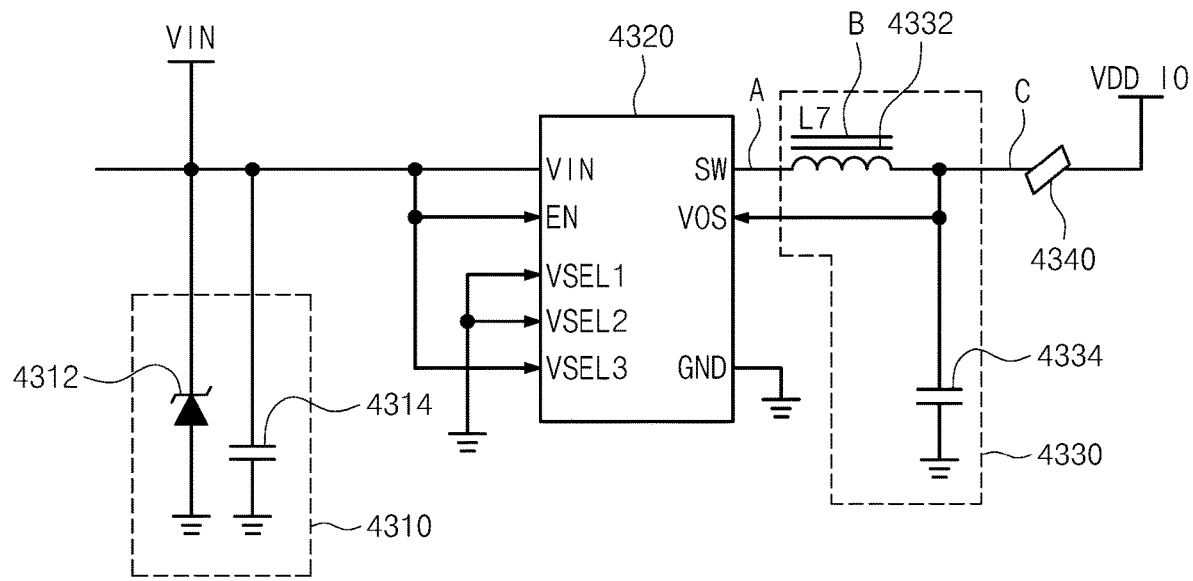
FIG. 2 is a circuit diagram illustrating a voltage reducing circuit unit of an inductive current generator of FIG. 1.
Figure 3:
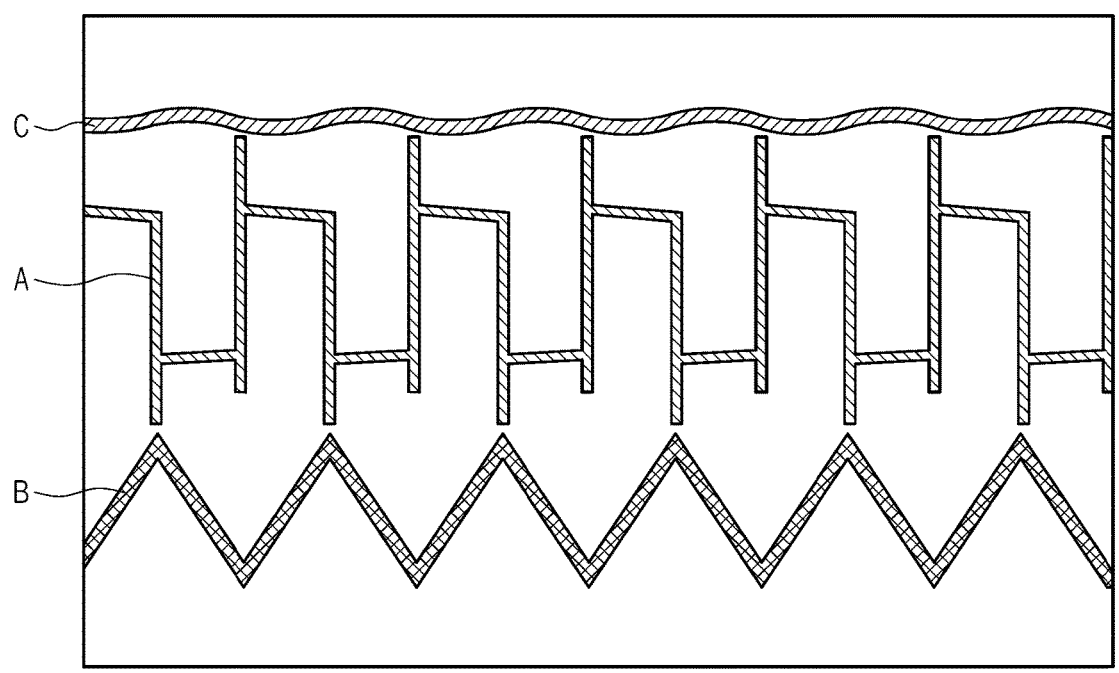
FIG. 3 illustrates a waveform of a signal measured at a specific node of the voltage reducing circuit unit of FIG. 2.

FIG. 2 is a circuit diagram illustrating a voltage reducing circuit unit of an inductive current generator of FIG. 1, and FIG. 3 illustrates a waveform of a signal measured at a specific node of the voltage reducing circuit unit of FIG. 2.

As illustrated in FIG. 2, the voltage reducing circuit unit of inductive current generator may include a constant voltage unit 4310, a first signal converting unit 4320, a second signal converting unit 4330, and a ripple removing unit 4340.

In this case, the constant voltage unit 4310 may maintain an input signal, which is input into a first input stage 'VIN' of the first signal converting unit 4320, to have a constant voltage.

For example, the constant voltage unit 4310 may include a zener diode 4312 having one side connected to the first input stage 'VIN' of the first signal converting unit 4320 and an opposite side which is grounded, and an input capacitor 4314 having one side, which is connected to a node interposed between the first input stage 'VIN' of the first signal converting unit 4320 and the one side of the zener diode 4312, and an opposite side which is grounded.

In this case, in the constant voltage unit 4310, the zener diode 4312 and the input capacitor 4314 may be parallel-connected to each other.

In addition, the first signal converting unit 4320 may convert an input signal, which is input into a first input stage 'VIN' of the first signal converting unit 4320, to a pulse signal to be output and to maintain the amplitude of the output signal, which is output through conversion to the pulse signal by the first signal converting unit 4320, based on a feedback signal output from the second signal converting unit 4330 and input into a second input stage 'VOS' of the first signal converting unit 4320.

For example, the first signal converting unit 4320 may include a pulse signal converter to convert the input signal to the pulse signal when the input signal is input into the first input stage 'VIN', and to output the converted pulse signal to an output stage 'SW', and a comparator to compare the feedback signal with the input signal when the feedback signal output from the second signal converting unit 4330 is input into the second input stage 'VOS' and to maintain the amplitude of a first output signal output to the output stage 'SW' of the first signal converting unit 4320.

The second signal converting unit 4330 may receive the converted pulse signal from the first signal converting unit 4320, to convert the pulse signal to a smoothing signal to be output, and to feed back a second output signal (feedback signal), which is output through conversion to the smoothing signal, to the first signal converting unit 4320.

For example, the second signal converting unit 4330 may include an inductor 4332 having one side connected to the output stage 'SW' of the first signal converting unit 4320 and an opposite side connected to the second input stage 'VOS' of the first signal converting unit 4320, and a capacitor 4334 having one side connected to the opposite side of the inductor 4332 and an opposite side which is grounded.

The ripple removing unit 4340 may be connected to the output stage of the second signal converting unit 4330 to remove a ripple of the output signal from the second signal converting unit 4330.

For example, the ripple removing unit 4340 may include a ferrite bead, but the inventive concept is not limited thereto.

As illustrated in FIG. 3, the voltage reducing circuit unit of the inductive current generator may convert the input signal into a pulse signal 'A' by the first signal converting unit 4320.

In addition, the voltage reducing circuit unit may convert the pulse signal 'A' to a smoothing signal 'C' having a lowered amplitude by the second signal converting unit 4330.

As described above, the voltage reducing circuit unit may reduce an input voltage based on the maximum current consumption of the fingerprint recognition unit and the control unit and may output the reduced voltage.

For example, the voltage reducing circuit unit may reduce the input voltage such that the current value equal to or greater than the maximum current consumption of the fingerprint recognition unit and the control unit is supplied to the fingerprint recognition unit and the control unit.

This is because when the voltage reduced through the voltage reducing circuit unit is applied to the fingerprint recognition unit and the control unit, the maximum current consumption efficiency of the fingerprint recognition unit and the control unit is increased to increase the operating distance, thereby improving the fingerprint recognition function.

According to the inventive concept, the fingerprint recognition card has following effects.

According to the inventive concept, power may be output by generating the inductive current and reducing the input voltage to allow an operation without additional power, so the fingerprint recognition card may be manufactured at the lower cost, with light weight, in a smaller size, and the power consumption efficiency may be optimized to increase the operating distance, thereby improving the fingerprint authentication function.

The additional range to which the inventive concept is applicable may be apparently understood from the following detailed description. It could be understood by those skilled in the art that various modifications fall into the technical scope of the inventive concept. Accordingly, it should be understood that the detailed description and specific embodiments, such as exemplary embodiments of the inventive concept, are provided only for the illustrative purpose.

The features, the structures, and the effects described in the inventive concept are included in at least one embodiment of the inventive concept, and not limited to only one embodiment. Further, the feature, the structure, and the effect illustrated in each embodiment are able to be combined with those of other embodiments or modified by those skilled in the art to which embodiments pertain. Accordingly, it should be interpreted that the combination and the modification fall into the technical scope of the inventive concept.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative. For example, components illustrated in the embodiment may be modified and reproduced. In addition, it should be interpreted that the differences from the modification and the application fall in the technical scope of the inventive concept defined in attached claims.

What is claimed is:

1. A fingerprint recognition card comprising:
    a fingerprint recognition unit configured to detect a fingerprint of a user;
    a control unit configured to perform registration authentication for the detected fingerprint of the user;
    a communication unit configured to perform tagging to an external reader depending on the registration authentication of the control unit; and
    an inductive current generator configured to generate an inductive current in response to approaching the external reader,
    wherein the inductive current generator comprises:
        a coil antenna unit configured to generate the inductive current when a distance to the external reader is within a predetermined distance;
        a rectifying unit configured to convert the generated inductive current from an alternating current (AC) signal to a direct current (DC) signal; and
        a voltage reducing circuit unit configured to generate an output voltage by reducing an input voltage generated from the converted DC signal and to supply the reduced output voltage to the fingerprint recognition unit, the control unit, and the communication unit,
    wherein the voltage reducing circuit unit comprises a first signal converting unit and a second signal converting unit,
    wherein the first signal converting unit comprises:
        a pulse signal converter configured to convert the DC signal from the rectifying unit, which is input to a first input stage of the first signal converting unit, to a pulse signal and to output the converted pulse signal to an output stage of the first signal converting unit; and
        a comparator configured to compare a feedback signal from the second signal converting unit, which is input to a second input stage of the first signal converting unit, with the DC signal from the rectifying unit in order to maintain an amplitude of the pulse signal output to the output stage based on the comparison,
    wherein the voltage reducing circuit further comprises a constant voltage unit configured to maintain the DC signal input to the first input stage to have a constant voltage,
    wherein the constant voltage unit comprises:

a zener diode having a first end connected to the first input stage of the first signal converting unit and a second end which is grounded; and an input capacitor having a first end connected to the first input stage of the first signal converting unit and a second end which is grounded, wherein the zener diode and the input capacitor are parallel-connected to each other between the first input stage and a ground.

2. The fingerprint recognition card of claim 1, wherein the coil antenna unit includes a coil wound around an outermost edge of a card surface along the outermost edge.

3. The fingerprint recognition card of claim 1, wherein the second signal converting unit is configured to:

receive the converted pulse signal from the first signal converting unit, convert the converted pulse signal to a smoothing signal, and output the converted smoothing signal; and feed back the feedback signal to the second input stage of the first signal converting unit, the feedback signal being a second output signal, the second output signal being the converted smoothing signal.

4. The fingerprint recognition card of claim 3, wherein the second signal converting unit includes:

an inductor having a first end connected to the output stage of the first signal converting unit and a second end connected to the second input stage of the first signal converting unit; and a second capacitor having a first end connected to the second end of the inductor and a second end which is grounded.

5. The fingerprint recognition card of claim 4, wherein the voltage reducing circuit unit is configured to:

supply the output voltage, which is generated by reducing the input voltage, to the fingerprint recognition unit and the control unit, such that a current value equal to or greater than a maximum current consumption of the fingerprint recognition unit and the control unit is supplied to the fingerprint recognition unit and the control unit.

6. The fingerprint recognition card of claim 3, wherein the voltage reducing circuit unit further comprises:

a ripple removing unit connected to an output stage of the second signal converting unit to remove a ripple of the smoothing signal which is output from the second signal converting unit.

7. The fingerprint recognition card of claim 6, wherein the ripple removing unit includes a ferrite bead.

8. The fingerprint recognition card of claim 1, wherein the control unit is configured to:

determine whether the detected fingerprint is a registered fingerprint when the fingerprint is detected from the fingerprint recognition unit; and control the communication unit to perform tagging to the external reader, when the detected fingerprint is the registered fingerprint.

9. The fingerprint recognition card of claim 1, wherein the voltage reducing circuit unit includes no resistor.

\* \* \* \* \*